Patented Dec. 6, 1949

2,490,704

UNITED STATES PATENT OFFICE 2,490,704

REACTION PRODUCT OF SULFONATED COPPER PHTHALOCYANINE WITH AN ALKANOLAMINE

John Paige, Albany, N. Y., assignor to General Aniline & Film Corporation, New York, N. Y., a corporation of Delaware No Drawing. Application May 1, 1946, Serial No. 666,530

2 Claims. (Cl. 260—314.5)

The present invention relates to colored pigments and particularly to pigments which are salts resulting from the combination of an organic acid dyestuff with an N-polyalkyl polymethyleneolamine.

It is an object of the present invention to provide coloring matters which may be employed in nitrocellulose lacquer, spirit varnishes and the like.

A further object of the invention is the provision of water insoluble coloring matters which have uses, among others, in coloring varnishes and lacquers and which have good fastness to light.

In accordance with the present invention, an organic dyestuff containing at least one acidic group is reacted with an N-dialkyl polymethyleneolamine wherein the N-dialkyl groups have eight carbon atoms, to form a salt which is insoluble in water. The pigment produced is slightly soluble in acetone and readily soluble in methanol, denatured alcohol and in Cellosolve. The compounds of the present invention may be employed directly for coloring nitrocellulose lacquer, varnishes, enamels, or the like, or may be mechanically mixed with a suitable substrata, as for example, aluminum hydroxide, heavy spar, or precipitated barium sulfate, or a mixture thereof may be rubbed on with varnish and printed, or rubbed on with linseed oil and spread or brushed on with an aqueous binding agent, to produce a covering of the desired hue fast to light. They may also be employed for coloring of films, threads, plastic masses as well as surfaces subject to exposure to water. They may be dissolved in various suitable solvents and employed as wood stains, or can be used for the coloring of shellac and various other natural and synthetic resins or plastics.

Any organic compound having an absorbing action upon visible or invisible light waves and which contains at least one acidic salt-forming group, is suitable for reacting with the N-dialkyl polymethyleneolamine. Preferably, those dyestuffs containing polyoxygen acidic groups, such as the carboxylic group or sulfonic group are employed, and it is apparent that the dyestuffs containing the lesser number of acidic groups require less of the N-dialkyl polymethyleneolamine to combine therewith. Thus, I prefer to employ dyestuffs containing one or two polyoxygen acidic groups for most purposes, although dyestuffs containing a greater number of acidic groups may be employed. For this purpose, there may be employed, for example, compounds absorbing ultra-violet light, fluorescent compounds, sulfonated phthalocyanines, metallized or not, azo dyes of various kinds containing sulfonic acid groups or carboxylic acid groups, including azo dyes containing arylpyrazolones or sulfoarylpyrazolones as a component, or containing hydroxy or vicinal hydroxy carborxylic acid groups, metallized or not. Examples of such compounds are the combination of diazotized o-aminobenzene sulfonic acid with 5-oxo-1-(o-sulfophenyl)-2-pyrazole-3-carboxylic acid; or diazotized p-aminobenzene sulfonic acid with 1 - (2'-chloro-5'-sulfophenyl)-3-methyl-5-pyrazolone; the chrominum complex salt of 2-naphthol - 4 - sulfonic acid-1-azo-nitrophenylmethyl pyrazolonesulfonamide; diazotized aminobenzenesulfonic acid and 2-benzamido-5-naphthol-7-sulfonic acid; diazotized p-nitraniline with salicylic acid (C. I. 40); tetrazotized 3,3'-dichlorobenzidine with two moles sodium 2-naphthylamine-3,6-disulfonic acid (C. I. 436); diazotized m-toluidine with 1-benzamido-8-naphthol-4,5-disulfonic acid; diazotized p-phenylazoaniline with 2-naphthol-6,8-disulfonic acid or with 2-naphthol-3,6,8-trisulfonic acid; diazotized aniline with 2-naphthol-8-sulfonic acid; 6 ureido bis (2 - phenylazo - 1-naphthol-3-sulfonic acid); and the like. Other classes of suitable compounds include sulfonated anthraquinone coloring matters, such as 1-amino-4-anilino anthraquinone - 2-sulfonic acid, 1,4-ditoluino-5,8-dihydroxy anthraquinone disulfonate, sodium 1 - amino - 4-anilinoanthraquinone 2-sulfonate, 1 -(p-acetamidoanilino)-4-aminoanthraquinone 2-sulfonic acid, 1,4-dihydroxy-5,8-di(p-toluino)-anthraquinone disulfonic acid, 1,5-dihydroxy-4,8-di(p-toluino)-anthraquinone disulfonic acid, 1,4-diaminoanthraquinone-2-sulfonic acid, 1-hydroxy - 4 - (p - toluino)-anthraquinone sulfonic acid, 1,5-di(p-toluino)-anthraquinone disulfonic acid, 6-(sulfo-p-toluino)-anthrapyramidine, 6-sulfo-toluino-2-anthrapyramidine, 2-sulfophenoxy-1,4-diaminoanthraquinone, polyhydroxy-anthraquinone sulfonic acids, such as alizarine sulfonic acid or hexahydroxyanthraquinone-3,7-disulfonic acid, xanthene coloring matters, such as the rhodamines, for example, Violamine B (C. I. 757) Acid Violet 4R (C. I. 758), or triarylmethane, dyestuffs.

By the term polymethyleneolamine as herein employed is meant the ethylene group or higher homologues thereof having a free hydroxyl group and having also an end amino group. The N-dialkyl polymethyleneolamines useful in the present invention may be represented by the following formula:

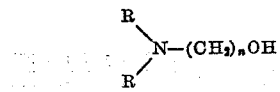

where R represents like or unlike alkyl groups containing 8 carbon atoms, and $n$ is a whole number greater than one. The compounds of the above formula may be prepared in known manner, for example, by acting on monoethanol amine with a corresponding dialkyl sulfate, such as, for example, dioctyl sulfate in the presence of an acid binding agent such as caustic soda, or by reacting the dioctylamine with ethylene oxide.

The reaction with the N-dialkyl polymethyleneol amine may be carried out with the acid dyestuff in the form of its free acid, or in the form of the respective metal salt thereof. Where the reaction is carried out in a solvent medium, the pigment solution may be used as such, or the pigment may be precipitated by dilution with water, or by evaporating off the solvent, or in any other suitable manner.

The invention will be described in connection with the following examples:

*Example 1*

50 grams of a sulfonated copper phthalocyanine are dissolved in about 2 liters water heated to about 60° C. and 18 grams of N-di(2-ethylhexyl) ethanolamine dissolved in about 220 cc. of water and 33 grams phosphoric acid are added slowly over a period of about fifteen to twenty minutes while the temperature is maintained at about 60° C. A slight tarry precipitate forms during the addition and when all has been added a spot test on filter paper shows a very slight blue rim. The precipitate is washed with about 500 cc. of water at about 50° C. and is then dried. The product is a blue powder, insoluble in water, slightly soluble in acetone and readily soluble in methanol, denatured alcohol and in Cellosolve with a blue color.

*Example 2*

Using in place of the dyestuff in Example 1 the red dye obtained from diazotized p-amino azo benzene monosulfonic acid with 2-benzoylamino-5-naphthol-7-sulfonic acid, there is obtained a red powder, insoluble in water, slightly soluble in acetone, and readily soluble in methanol, denatured alcohol or Cellosolve with a red color.

*Example 3*

Using in place of the dyestuff in Example 1 the yellow dye obtained from diazotized o-sulfanilic acid and N-(o-sulfophenyl)-3-carboxylic acid-5-pyrazolone, there is obtained a yellow powder soluble in methanol, denatured alcohol, or Cellosolve with a yellow color.

In these examples the phosphoric acid may be replaced by any acid which will solubilize the amine such as hydrochloric and acetic acids. Furthermore, although it is preferable to use the acid to solubilize the amine, the reaction will proceed without the acid.

I claim:

1. The reaction product of copper phthalocyanine obtained by reacting sulfonated copper phthalocyanine with an N-dialkyl ethanolamine wherein the alkyl groups each contain 8 carbon atoms.

2. The reaction product of copper phthalocyanine obtained by reacting sulfonated copper phthalocyanine with N-di(2-ethylhexyl) ethanolamine.

JOHN PAIGE.

REFERENCES CITED

The following references are of record in the file of this patent:

UNITED STATES PATENTS

| Number | Name | Date |
|---|---|---|
| 931,423 | Hesse et al. | Aug. 17, 1909 |
| 969,428 | Volkmann | Sept. 6, 1910 |
| 1,836,047 | Somerville | Dec. 15, 1931 |
| 1,836,048 | Somerville | Dec. 15, 1931 |
| 2,022,678 | Kritchevsky et al. | Dec. 3, 1935 |
| 2,095,077 | Payne | Oct. 5, 1937 |
| 2,153,740 | Carleton et al. | Apr. 11, 1939 |
| 2,187,816 | Hartmann et al. | Jan. 23, 1940 |
| 2,315,870 | Nadler et al. | Apr. 6, 1943 |

OTHER REFERENCES

Dalhen, Ind. & Eng. Chem., vol. 31 (July 1939), page 846.